(12) United States Patent
Nakazono

(10) Patent No.: US 7,549,573 B2
(45) Date of Patent: *Jun. 23, 2009

(54) MESSAGE SYSTEM, MESSAGE CREATING METHOD AND MESSAGE CREATING PROGRAM

(75) Inventor: Kyou Nakazono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/492,873

(22) Filed: Jul. 26, 2006

(65) Prior Publication Data

US 2006/0261147 A1    Nov. 23, 2006

Related U.S. Application Data

(62) Division of application No. 11/082,905, filed on Mar. 18, 2005, now Pat. No. 7,097,096, which is a division of application No. 10/084,047, filed on Feb. 28, 2002, now Pat. No. 6,883,703.

(30) Foreign Application Priority Data

Feb. 28, 2001   (JP)   ............................. 2001-054692

(51) Int. Cl.
*G06F 17/00* (2006.01)
(52) U.S. Cl. .................. 235/375; 235/380; 235/487
(58) Field of Classification Search ............... 235/375, 235/493, 380, 487; 705/16, 17; 707/10
See application file for complete search history.

(56) References Cited

U.S. PATENT DOCUMENTS 5,023,772 A * 6/1991 King ............... 710/4
5,530,232 A 6/1996 Taylor
5,880,445 A 3/1999 Mori et al.
5,995,966 A 11/1999 Kii et al.
6,498,987 B1 12/2002 Kelly et al.
6,883,703 B2 4/2005 Nakazono

FOREIGN PATENT DOCUMENTS

| EP | 0 989 512 | 3/2000 |
|---|---|---|
| GB | 2 349357 | 11/2000 |
| JP | 3-167666 | 7/1991 |
| JP | 8-110795 | 4/1996 |
| JP | 8-249393 | 9/1996 |
| JP | 8-289022 | 11/1996 |
| JP | 8-339288 | 12/1996 |
| JP | 9-161031 | 6/1997 |
| JP | 9-212547 | 8/1997 |
| JP | 11-066427 | 3/1999 |
| JP | 11-120199 | 4/1999 |
| JP | 11-291675 | 10/1999 |
| JP | 11-306442 | 11/1999 |
| JP | 11-339128 | 12/1999 |
| JP | 11-351901 | 12/1999 |
| JP | 2001-022838 | 1/2001 |

\* cited by examiner

*Primary Examiner*—Ahshik Kim
(74) *Attorney, Agent, or Firm*—Oblon, Spivak, McClelland, Maier & Neustadt, P.C.

(57) ABSTRACT

Attribute information representing at least one attribute of each member in a system is recorded on a card. The attribute information includes fixed information settled at the time of member registration and record-information which may be changed in accordance with performance of each member. A controller creates a message corresponding to the at least one attribute shown in the attribute information recorded on the card. A recorder writes the message created by the controller on the card.

8 Claims, 12 Drawing Sheets

FIG. 3A

ATTRIBUTE INFORMATION (201)

| STUDENT NO. | NAME | CLASS | ATTENDANCE | MARK INFORMATION | SCHOOL TO APPLY TO | POINTS | ...... | ...... |
|---|---|---|---|---|---|---|---|---|
| 123456 | TARO YOSHIDA | A | ABSENT YESTERDAY | AVERAGE MARK | "K" JUNIOR HIGH | 5 3 0 | | |

FIG. 3B

WORD/PHRASE TABLE (211)

| CLASS | COURSE NAME | BEGINNING DATE | FINAL DATE | PLACE | STARTING TIME | ENDING TIME |
|---|---|---|---|---|---|---|
| A | SUMMER SPECIAL COURSE | JUL. 12TH | AUG. 20TH | R5 BD G | 8:00AM | 3:00PM |
| ..... | ..... | ..... | ..... | ..... | ..... | ..... |

FIG. 3C

WORD/PHRASE TABLE (213)

| ATTENDANCE | CONFIRMATION COMMENT | WATCH-OUT COMMENT |
|---|---|---|
| ABSENT YESTERDAY | "YOU WERE ABSENT FROM CLASSES YESTERDAY" | "TAKE CARE OF YOURSELF NOT TO CATCH COLD" |
| ABSENT FOR THREE DAYS | "YOU WERE ABSENT FROM CLASSES FOR THREE DAYS" | "HOPE YOU GOT WELL NOW" |
| ..... | | ..... |

FIG. 3D

WORD/PHRASE TABLE 215

| MARK INFORMATION | NOTIFICATION COMMENT | EVALUATION COMMENT | .... |
|---|---|---|---|
| .... | .... | .... | .... |
| AVERAGE 68 | YOUR AVERAGE MARK IS 68 | WELL DONE ! | .... |
| AVERAGE 43 | YOUR AVERAGE MARK IS 43 | TRY LITTLE HARDER ! | .... |
| .... | .... | .... | .... |

FIG. 3E

CONDITION TABLE (ENTRANCE-EXAM DATE TABLE) 221

| SCHOOL NAME | DATE OF ENTRANCE EXAM |
|---|---|
| "A" JUNIOR HIGH | FEB/20/2002 |
| .... | .... |
| "K" JUNIOR HIGH | MAR/02/2002 |
| .... | .... |

FIG. 3F

| CONDITION TABLE (ENCOURAGING COMMENT TABLE) | |
|---|---|
| REMAINING DAYS BEFOR EXAM | ENCOURAGING COMMENT |
| 45 DAYS OR MORE | GOOD LUCK! |
| 15-45 DAYS | TRY HARD! |
| 7-15 DAYS | LITTLE MORE! |
| 7 DAYS OR LESS | ALMOST! |

FIG. 3G

| MESSAGE TABLE | |
|---|---|
| ATTRIBUTE | MESSAGE |
| CLASS | "(COURSE) WILL BE HELD IN (PLACE) FROM (BEGINNING DATE) UNTIL (FINAL DATE), AND STARTS FROM (STARTING TIME) TO (ENDING TIME)" (CONFIRMATION COMMENT) |
| ATTENDANCE | (WATCH-OUT COMMENT) |
| MARK INFORMATION | (NOTIFICATION COMMENT) (EVALUATION COMMENT) |
| POINTS | (POINTS) |
| SCHOOL TO APPLY TO | "THERE IS LEFT (REMAINING DAYS) BEFORE ENTRANCE EXAM OF (SCHOOL NAME), (ENCOURAGING COMMENT)" |

FIG. 10

| STUDENT NO. | NAME | ATTRIBUTE INFORMATION ||||||
|---|---|---|---|---|---|---|---|
| | | CLASS | ATTENDANCE | MARK INFORMATION | SCHOOL TO APPLY TO | POINTS | E-MAIL ADDRESS | ...... | ...... |
| | | | | AVERAGE MARK | | | |
| 123456 | TARO YOSHIDA | A | ABSENT YESTERDAY | | "K" JUNIOR HIGH | 5 3 0 | abc@def.com | ...... | ...... |

201

MESSAGE SYSTEM, MESSAGE CREATING METHOD AND MESSAGE CREATING PROGRAM

CROSS-REFERENCE TO RELATED APPLICATIONS

The present application is a divisional of U.S. application Ser. No. 11/082,905, filed on Mar. 18, 2005 now U.S. Pat. No. 7,097,096, which in turn is a divisional of U.S. application Ser. No. 10/084,047 filed on Feb. 28, 2002, now U.S. Pat. No. 6,883,703, and in turns claims priority to JP 2001-054692, filed on Feb. 28, 2001, the entire contents of each of which are hereby incorporated herein by reference.

BACKGROUND OF THE INVENTION

1. Field of the Invention

The present invention relates to a message system, a message creating method and a message creating program, for creating a message suitable for each member (in a predetermined organization, system, etc.) and providing the created message to each member.

2. Description of the Related Art

As a tool for effectively managing registered members in a predetermined system, etc., it is common to employ membership cards. The information to be recorded on each membership card is only ID information (member number, member name, etc.) for identifying the member, usually. In other words, any other information corresponding to each member is not recorded on the membership card. Further, the recorded information can not be updated in accordance with the past records of each member's performance in a certain field.

Accordingly, the information to be recorded on the membership card is not interesting information for each member. Thus, the membership card itself does not contribute to the sales improvement or keeping of customers (members) in the system, or does not effectively function for sales performance.

Unexamined Japanese Patent Application KOKAI Publication No. H11-120199 discloses a technique for creating a message corresponding to individual member and for providing each member with the created message.

The above publication does not disclose a technique for creating a message based on user performance on a particular field. That is, according to the above publication, a message corresponding to the past records of member's performance can not be created. In other words, according to the above publication, a message peculiarly corresponding to individual member can not be created. Thus, the user should not find something new in the message created according to the technique of the above publication.

According to the technique of the above publication, the created message is sent to a terminal device used by each user through a communications network, so as to provide the user with the created message through the terminal device. Hence, in the above publication, no disclosure regarding a card to be issued to the registered user is made. Therefore, even if the technique of the above publication is used, the improvement in the sales performance or the keeping the customers (members) within the organization, etc. can not be realized, using the membership card.

The contents of Unexamined Japanese Patent Application KOKAI Publication No. H11-120199 are herein incorporated in this specification.

SUMMARY OF THE INVENTION

The present invention has been made in consideration of the above. It is accordingly an object of the present invention to provide a message system, a message creating method and a message creating program, for creating a suitable message for each member in a predetermined system, organization, etc. and for providing each member with the created message.

In order to attain the above object, according to the first aspect of the present invention, there is provided a message system comprising:

a message creator which creates a message corresponding to at least one attribute of at least one member in a predetermined system, the at least one attribute being shown in attribute information including fixed information settled at a time of registering the at least one member and record-information updated in accordance with performance of the at least one member; and a writer which writes the message created by the message creator on a card possessed by the at least one member.

According to this invention, a message suitably corresponding to each member can be created, and the created message can be provided to each member.

The message system may further comprise a memory which stores a word/phrase table storing a plurality of words/phrases for use in creating the message, and wherein the message creator acquires at least one word or phrase corresponding to the at least one attribute of the at least one member from the word/phrase table, and creates the message using the acquired word or phrase.

The memory may further store a sentence including at least one non-settled information portion wherein no word/phrase has been settled yet; and the message creator may set the at least one word or phrase from the word/phrase table into the at least one non-settled information portion of the sentence, thereby creating the message.

The message system may further comprise a table creator which creates the word/phrase table and stores the created word/phrase table into the memory.

The table creator may create the word/phrase table corresponding to a change in an external factor.

The external factor may be a date;

the message system may further comprise a date acquirer which obtains a current date; and the table creator may create the word/phrase table corresponding to the current date obtained by the date acquirer.

The message system may further comprise:

a recorder which records the attribute information of the at least one member on the card possessed by the at least one member; and an accumulator which accumulates the record-information included in the attribute information, and wherein the recorder updates the record-information recorded on the card, using latest record-information accumulated by the accumulator.

The message system may further comprise a reader which reads out the attribute information of the at least one member who possesses the card, from the card, and wherein the message creator creates the message using the attribute information read out by the reader.

The writer may illustrate a drawing and/or illustration representing contents of the message on the card, together with the message.

The message system may further comprise an e-mail sender which sends an e-mail representing the message created by the message creator to the at least one member.

In order to attain the above object, according to the second aspect of the present invention, there is provided a message creating method comprising the steps of:

creating a message corresponding to at least one attribute of at least one member in a predetermined system, the at least one attribute being shown in attribute information including fixed information settled at a time of registering the at least one member and record-information updated in accordance with performance of the at least one member; and writing the created message onto a card possessed by the at least one member.

In order to attain the above object, according to the third aspect of the present invention, there is provided a program for controlling a computer to serve as a message system comprising:

a message creator which create a message corresponding to at least one attribute of at least one member in a predetermined system, the at least one attribute being shown in attribute information including fixed information settled at a time of registering the at least one member and record-information updated in accordance with performance of the at least one member; and a writer which writes the message created by the message creator on a card possessed by the at least one member.

BRIEF DESCRIPTION OF THE DRAWINGS

The object and other objects and advantages of the present invention will become more apparent upon reading of the following detailed description and the accompanying drawings in which:

FIGS. 3A to 3G are diagrams each showing information stored in a storage unit included in the card processor of FIG. 2;

FIG. 10 is a diagram showing a modification of attribute information stored in the storage unit of the card processor.

DETAILED DESCRIPTION OF THE PREFERRED EMBODIMENT

A message system according to an embodiment of the present invention will now be described with reference to the accompanying drawings.

In this embodiment, explanations will be made to the case wherein messages are recorded on a recording card issued to each student, who is a registered member of a preparatory educational institution, such as a coaching school or cramming school, etc.

Figure 1:
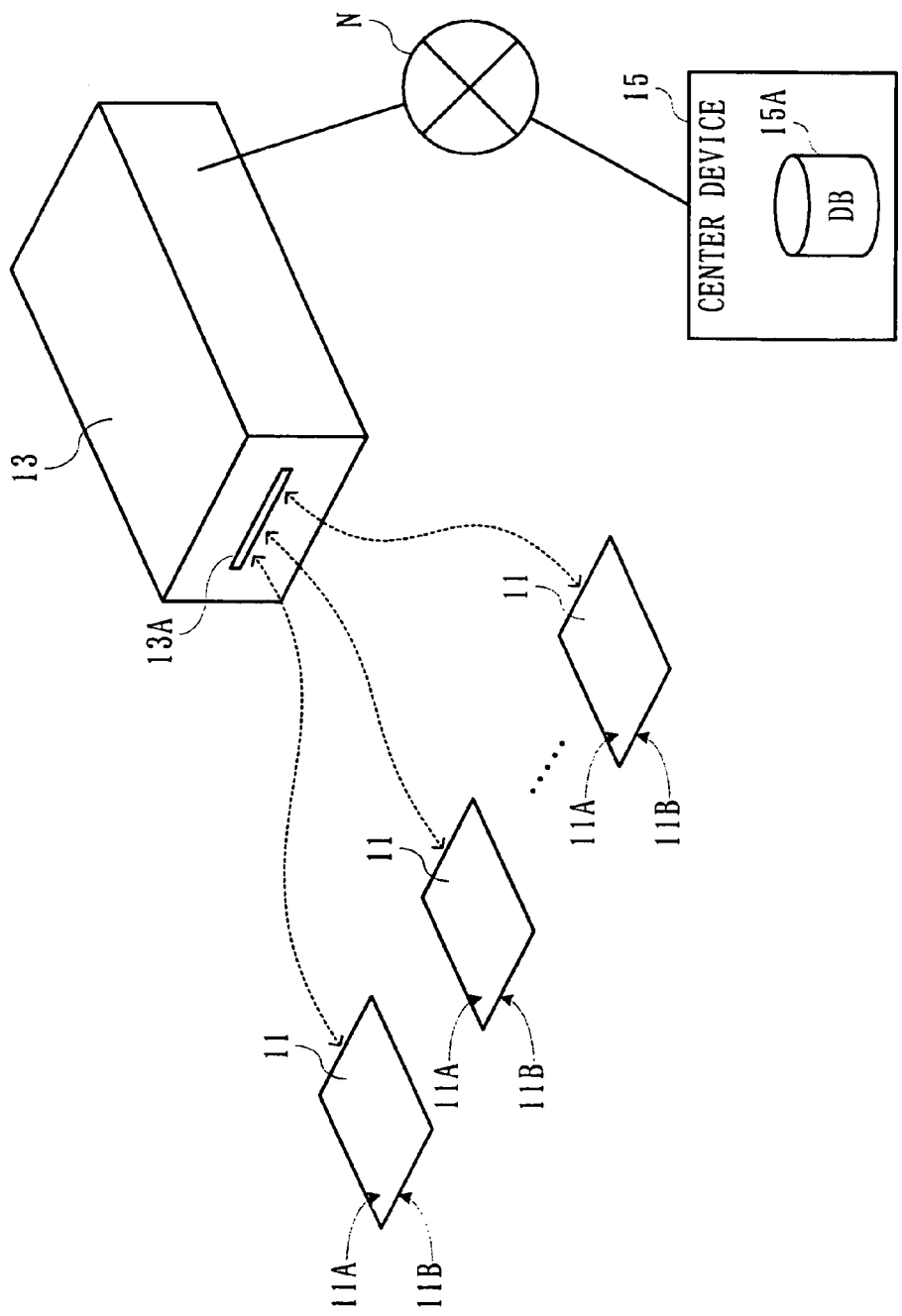
FIG. 1 is a diagram showing the structure of a message system according to an embodiment of the present invention.

The above-described message system comprises, as shown in FIG. 1, a plurality of recording cards 11, a card processor 13, a center device 15 and a network N. The card processor 13 and the center device 15 are connected with each other through the network N including a LAN (Local Area Network).

The plurality of recording cards 11 are issued by the educational institution to the students registered in the preparatory educational institution.

Each of the plurality of recording cards 11 has one side (a message recording side 11A), on which visible information is recorded and erased by heat, and the other side (a magnetic recording side 11B), on which magnetic information is recorded and updated.

A message corresponding to attributes of each student is recorded on the message recording side 11A, and attribute information representing the attributes of each student is recorded on the magnetic recording side 11B.

The attribute information includes information items representing a student number (a membership number of each corresponding student), the student name, the student's class, the student's choice of school to apply to, the attendance, exam marks of each student and points acquired by each student. Note that the points are calculated, based on the attendance of each student in classes and exam marks.

Of the above information items, information items representing the student number, the student name, the class and the student's choice of school to apply to are fixed information, which is settled and decided at the time each student is to be registered at the educational institution and which is not updated as long as the educational institution or the corresponding student does not intend to do so. On the other hand, those information items representing the attendance, the marks and the points are record-information which are updated in accordance with how each student does in the educational institution.

The card processor 13 has an insertion section 13A, and records information sent from the center device 15 through the network N on each of the recording cards 11 inserted from the insertion section 13A. The card processor 13 updates information recorded on the inserted recording card 11. The structure of the card processor 13 will be described later in more detail.

The center device 15 is a computer including an input device and a display device, etc., and is installed in the administrative office of the educational institution, for example. The center device 15 operates a pre-given program, in response to an operation of an operator of the educational institution.

For example, the center device 15 stores and manages fixed information of each student in a database 15A. The center device 15 accumulates the record-information of each student in the database 15A. The center device 15 sends fixed information of a new student to the card processor 13, together with a card-issuing signal for instructing the card processor 13 to issue the recording card 11. In response to a request from the card processor 13, the center device 15 sends record-information of a student specified by the card processor 13, to the card processor 13.

The structure of the card processor 13 will now specifically be explained.

Figure 2:
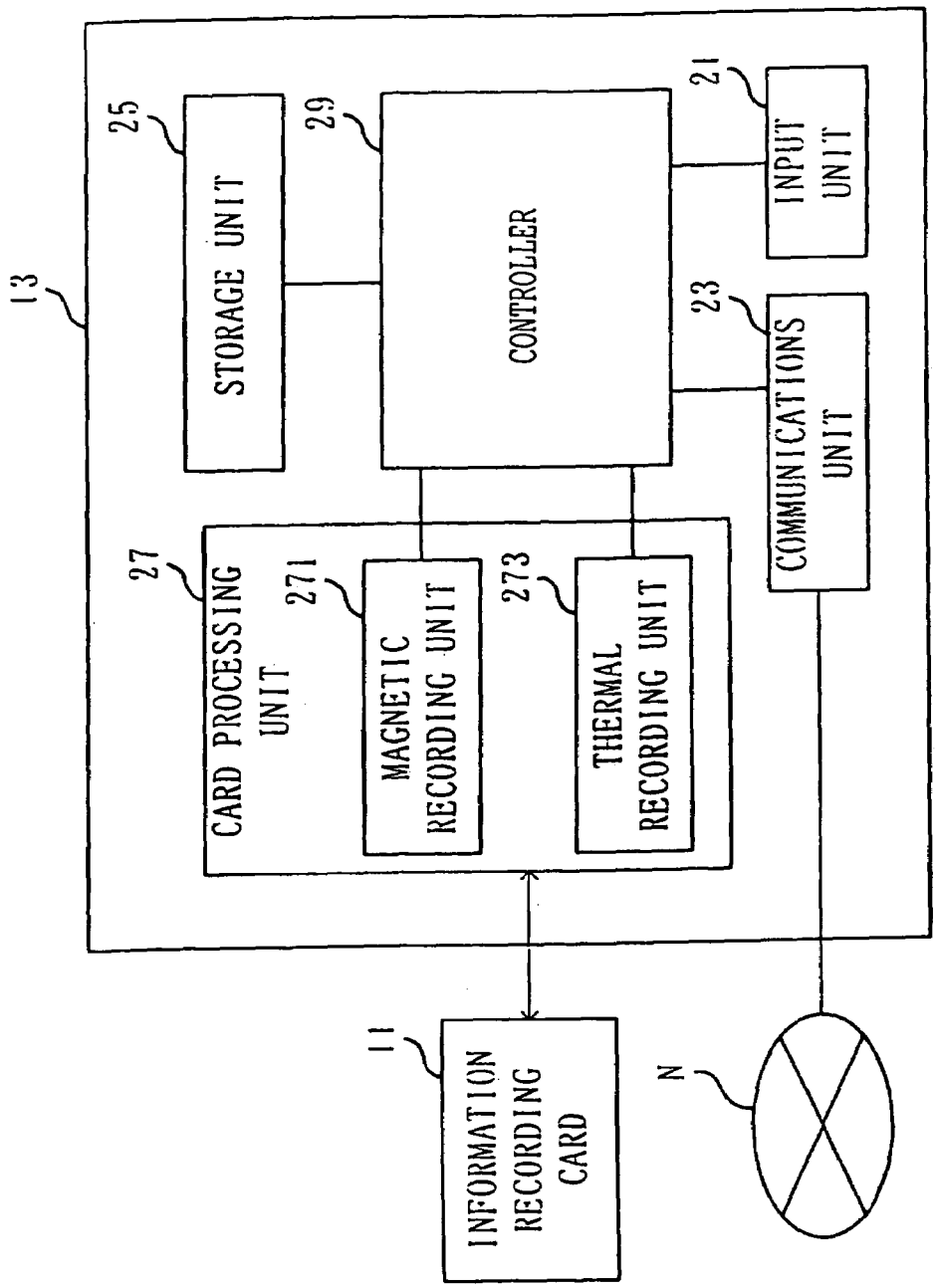
FIG. 2 is a diagram showing the structure of a card processor included in the message system of FIG. 1.

The card processor 13 comprises, as shown in FIG. 2, an input unit 21, a communications unit 23, a storage unit 25, a card processing unit 27 and a controller 29.

The input unit 21 is operated by the operator of the educational institution, for example. The input unit 21 outputs a signal for instructing the controller 29 to start/finish a predetermined operation to the controller 29, in response to an operation of the operator.

The communications unit 23 is connected to the center device 15 through the network N. The communications unit 23 relays data communications between the controller 29 and the center device 15.

The storage unit 25 includes a hard disk, a ROM (Read Only Memory) and/or a RAM (Random Access Memory). The storage unit 25 stores a program for controlling operations of the controller 29. The storage unit 25 stores message information necessary for producing a message recorded on the recording card 11. The contents of the message information will more specifically be described later.

The card processing unit 27 includes a magnetic storage unit 271 and a thermal storage unit 273.

The magnetic storage unit 271 includes a magnetic head, records and reads information on and from the magnetic recording side 11B of the recording card 11, under the control of the controller 29. The magnetic storage unit 271 updates information recorded on the magnetic recording side 11B of the recording card 11, under the control of the controller 29.

The thermal storage unit 273 includes a thermal head, erases the information recorded on the message recording side 11A of the recording card 11, and writes new information thereon, under the control of the controller 29.

The controller 29 includes a CPU (Central Processing Unit) executing the program stored in the storage unit 25. The controller 29 controls operations of each of the above-described units, in accordance with the program of the storage unit 25. Operations of the controller 29 will be explained in more detail later.

Explanations will now be made to the message information stored in the storage unit 25 of the card processor 13.

The message information includes information shown in FIGS. 3A, 3B, 3C, 3D, 3E, 3F and 3G.

Information shown in FIG. 3A is attribute information 201.

The attribute information 201 represents attributes of a student who possesses the recording card 11 inserted into the card processor 13.

Information shown in FIGS. 3B to 3D are word/phrase tables 211, 213 and 215, respectively.

The word/phrase table 211 stores information representing "course name", "scheduled beginning date", "scheduled final date", "place", "scheduled starting time" and "scheduled ending time" of courses to be held in each class of the educational institution, in association with each other. The same information is given to all students of the same class.

The word/phrase table 213 stores information representing "attendance", "confirmation comment" and "watch-out comment", in association with each other. The "confirmation comment" and "watch-out comment" are given to the students in accordance with the their attendance.

The word/phrase table 215 stores information representing "mark information", "notification comment" and "evaluation comment", in association with each other. The "notification comment" and "evaluation comment" are given to the students in accordance with their marks.

The information shown in FIGS. 3E and 3F are condition tables 221 and 223.

The condition table 221 stores information representing "name" of each target school to which students may be to apply and "entrance-exam date" of the school, in association with each other.

The condition table 223 stores information representing "remaining days" before the entrance exam and "encouraging comment" in association with each other. Each of students is given with the encouraging comment in accordance with the remaining days before the entrance exam.

Hereinafter, the condition table 221 is referred to as "entrance-exam date table 221", while the condition table 223 is referred to as "encouraging-comment table 223", in this specification.

Information shown in FIG. 3G is a message table 241.

The message table 241 stores the information representing "student attributes" (including classes, attendance in classes, marks, points, and school to apply to) and "message" including non-settled information portions, in association with each other. Those information items in brackets are not settled yet, as shown in FIG. 3G. The non-settled information portions are defined in advance, so as to be settled in accordance with attributes of each target student who is to receive a corresponding message.

For example, those non-settled information portions (to be including information of "course name", "beginning date", "final date", "place", "starting time" and "ending time"), which are included in the message corresponding to one attribute "class" in the uppermost section of the message table 241, are settled in accordance with the class of the corresponding student which is specified by the attribute information read out from the recording card 11.

Operations of a message system according to the embodiment of the present invention will now be explained.

Each applicant provides the preparatory educational institution with an application form, which is filled with required information, such as his/her name, selected course name and school to apply to.

The operator of the educational institution operates the center device 15, and inputs the required information in the provided application form in the center device 15. The operator inserts a new recording card 11 into the card processor 13, and operates the center device 15 and instructs the center device 15 to execute a predetermined registration process.

In response to the instruction of the operator, the center device 15 begins a registration process of the student in accordance with a program which is set in advance.

The center device 15 creates a new student number.

The center device 15 stores the created student number and the input required information in the database 15A as fixed information, in association with each other. This realizes registration of the applicant as a new student in the preparatory educational institution.

Subsequently, the center device 15 sends fixed information of the newly-registered student to the card processor 13, together with a card-issuing signal for instructing the card processor 13 to issue a new recording card.

The controller 29 of the card processor 13 controls the card processing unit 27 to record the fixed information provided together with the card-issuing signal on the recording card 11, in response to the card-issuing signal from the center device 15.

Specifically, the controller 29 controls the magnetic storage unit 271 to record attribute information of the newly-registered student on the magnetic recording side 11B of the recording card 11. Further, the controller 29 controls the thermal storage unit 273 to record the name of the newly-registered student and his/her student number on the message recording side 11A of the recording card 11. At the time the card is issued, the record-information included in the attribute information is set into an initial state.

By the above processes, the recording card 11 is issued to the newly-registered student, and the new student can take the course provided by the preparatory educational institution.

The operator of the educational institution inputs, into the center device 15, the attendance information of each student after each class and the mark information of each student after each trial exam is marked, for example.

The center device 15 retrieves the attendance information and mark information which are input by the operator, and accumulates the retrieved information in the database 15A in association with the student number, as record-information of each student.

The recording card 11 issued to each student is inserted into the card processor 13, every time the student attends the class of a corresponding course, for example.

The controller 29 of the card processor 13 performs the following operations in accordance with the program stored in the storage unit 25, upon insertion of the recording card 11.

The controller 29 controls the magnetic storage unit 271 to read out attribute information recorded on the magnetic recording side 11B of the inserted recording card 11, and stores the read attribute information in the storage unit 25 as attribute information 201.

The controller 29 accesses the center device 15 through the communications unit 23, and acquires the latest record-information (the attendance, marks and so-far earned points) of a student specified by the student number of the attribute information 201 from the center device 15.

The controller 29 updates the record-information shown in the attribute information 201 stored in the storage unit 25, using the acquired record-information.

Figure 4:
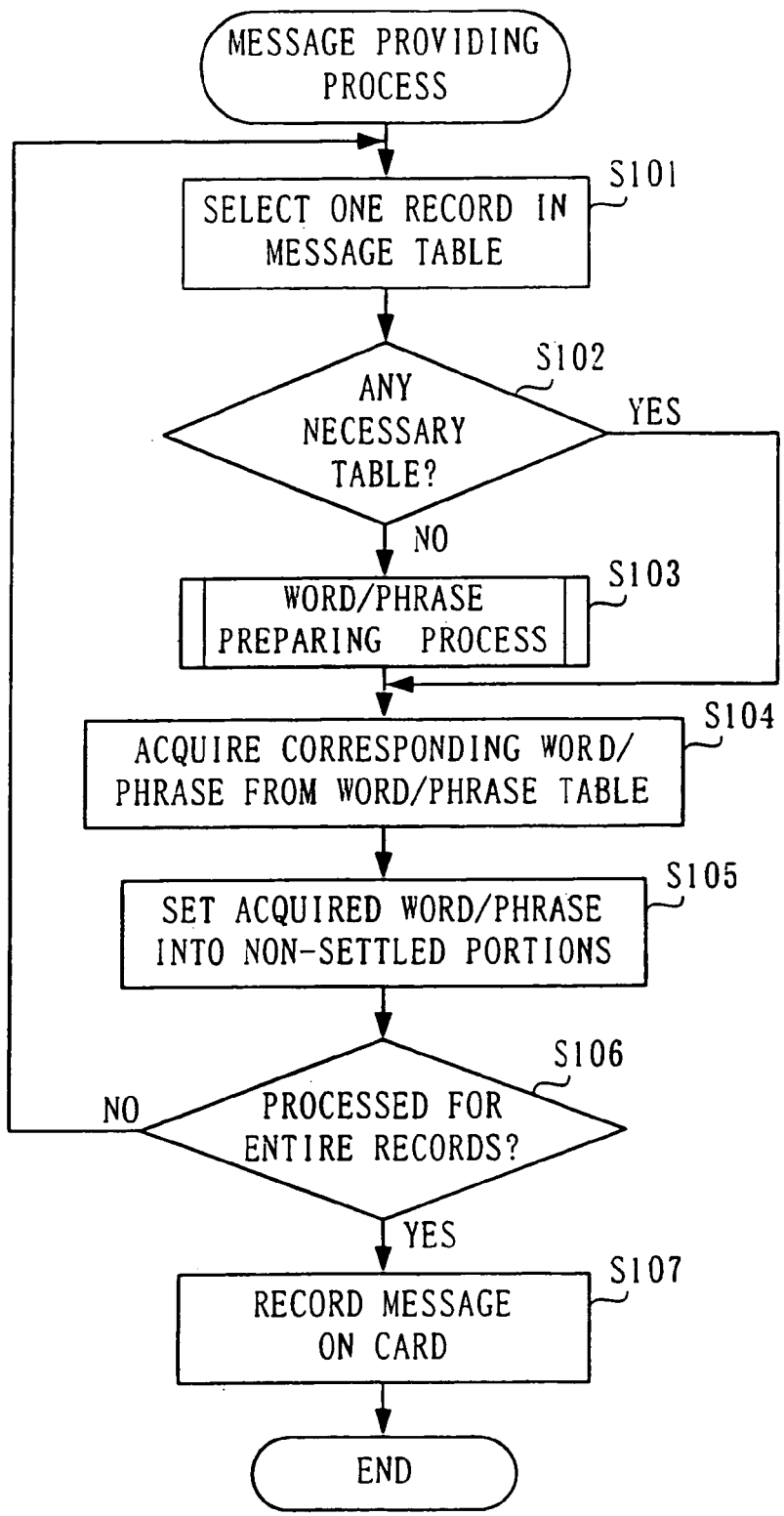
FIG. 4 is a flowchart showing a message providing process which is carried out by a controller of the card processor of FIG. 2.

After this, the controller 29 begins a message providing process shown in FIG. 4.

The controller 29 selects one record from a plurality of records included in the message table 241 stored in the storage unit 25 (Step S101).

The controller 29 determines whether a word/phrase table necessary for creating a message of the selected record is stored in the storage unit 25 (Step S102).

For example, in FIG. 3G, there is no word/phrase table showing the "remaining days" corresponding to one of the non-settled information portions included in the lowermost record of the message table 241.

In the case where it is determined that the necessary table is stored in the storage unit 25 (Step S102; YES), the controller 29 carries out a later-described step S104.

On the contrary, in the case where it is determined that the necessary table is not stored in the storage unit 25 (Step S102; NO), the controller 29 carries out a later-described word/phrase preparing process, wherein a necessary word/phrase table is created (Step S103).

The controller 29 acquires words and/or phrases necessary for creating the message of the selected record, from the word/phrase tables stored in the storage unit 25 (Step S104).

For example, as in FIG. 3G, the attribute of the uppermost record of the message table 241 is "class". In the case where the uppermost record of the message table 241 is selected in the step S101, the controller 29 refers to the attribute information 201 stored in the storage unit 25, and finds out the "class" of the corresponding student. In this case, the "class" is "A". The controller 29 then acquires words and/or phrases to fill up the non-settled information portions included in the message of the selected record. Since the "class" is "A", the controller 29 acquires the words and/or phrases corresponding to the class "A", from the word/phrase table 211 stored in the storage unit 25. In this case, the controller 29 acquires information representing the course name "summer special course", the beginning date "July $12^{th}$", the final date "August $20^{th}$", the place "building G, room 5", the starting time "8:00 am" and the ending time "3:00 pm".

The controller 29 sets the acquired words into the non-settled information portions of the message, respectively (Step S105).

In the case, for example, where the "class" is "A", the controller 29 sets the course name "summer special course", the beginning date "July $12^{th}$", the final date "August $20^{th}$", the place "building G, room 5", the starting time "8:00 am" and the ending time "3:00 pm" into the non-settled information portions of the message, respectively.

As shown in FIG. 3G, in the uppermost section of the message table 241, there is a message "(a course name) will be held in (place) from (beginning date) until (final date), and it starts from (starting time) to (ending time)". Upon setting of the above-described acquired words into the non-settled information portions, the message is completed, like "The summer special course will be held in Room 5 of Building G from July $12^{th}$ until August $20^{th}$, and it starts from 8:00 am to 3:00 pm".

By executing the above procedures of the steps S101 to S105, a message of one record is created.

After this, the controller 29 determines whether such procedures have been completed for the entire records included in the message table 241 (Step S106).

In the case where it is determined that the above procedures have not been done for the entire records of the message table 241 (Step S106; NO), the controller 29 returns to the step S101, and executes the above procedures of the steps S101 to S105 for any of non-executed records.

On the contrary, in the case where it is determined that the above procedures of the steps S101 to S105 have been completed for the entire records of the message table 241 (Step S106; YES), the controller 29 controls the thermal storage unit 273 to write the created message on the message recording side 11A of the recording card 11 (Step S107) so as to complete the message providing process.

The controller 29 executes the above-described message providing process, and controls the magnetic storage unit 273 to record the attribute information 201 including updated record-information, on the magnetic recording side 11B of the recording card 11. By so doing, the attribute information recorded on the magnetic recording side 11B of the recording card 11 is updated.

Figure 5:
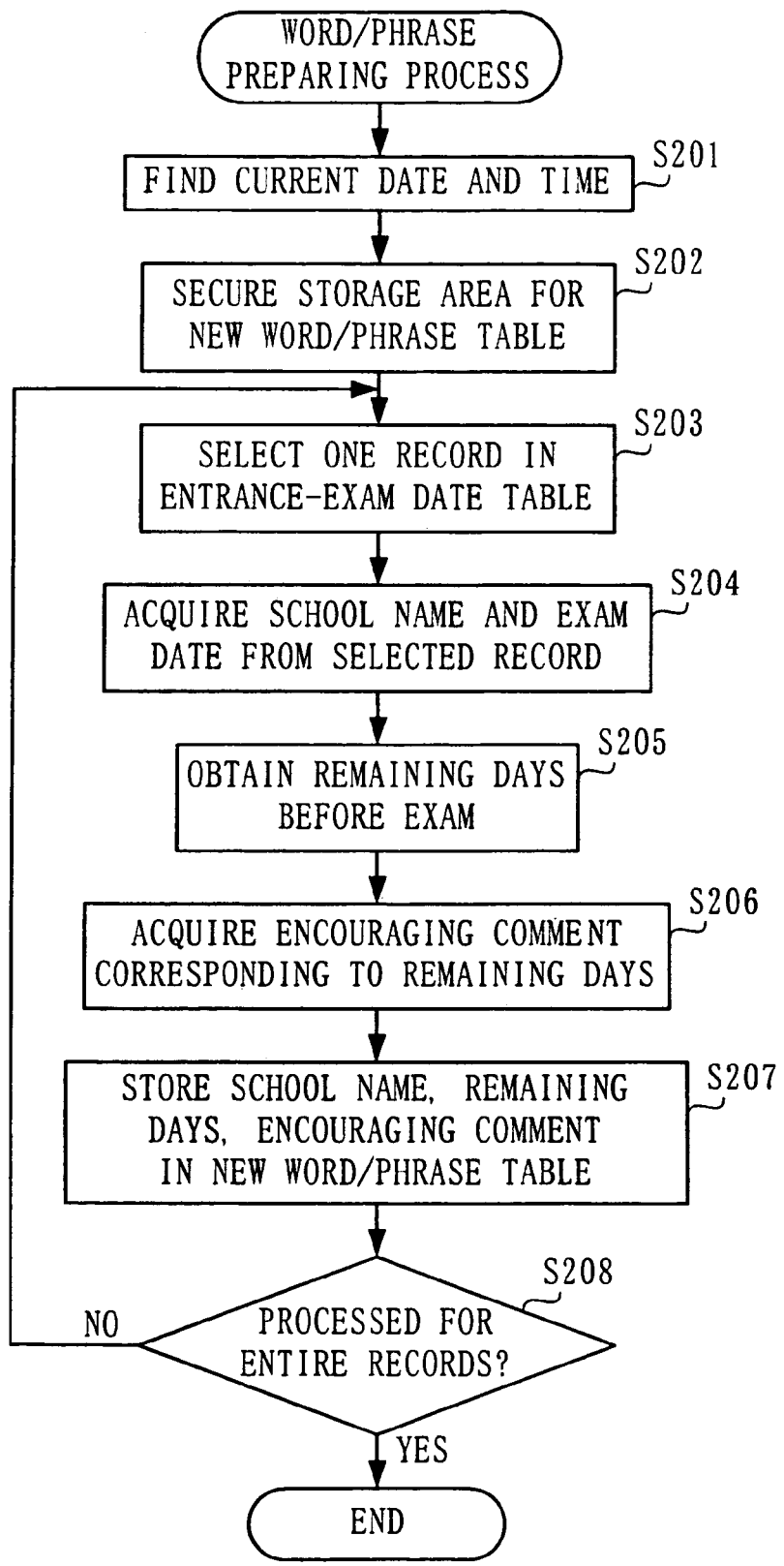
FIG. 5 is a flowchart showing a word/phrase preparation process which is carried out by the controller of the card processor of FIG. 2.

The word/phrase preparing process will more specifically be explained with reference to FIG. 5.

For example, the message of the lowermost record of the message table 241 is, as shown in FIG. 3G, "There is left (remaining days) before the entrance exam of (school name). (Encouraging comment)". This message includes information (words/phrases) of "remaining days", which may differ depending on an external factor (specifically the date/time). Hence, the word/phrase table including the "remaining days" needs to be updated once a day.

The controller 29 keeps the current date and time, in accordance with the program stored in the storage unit 25.

The controller 29 finds out the date (what date is today) the recording card 11 is inserted (Step S201). Explanations will now be made to the case where the today's date is "Feb. 13, 2002", by way of example.

Figure 6:
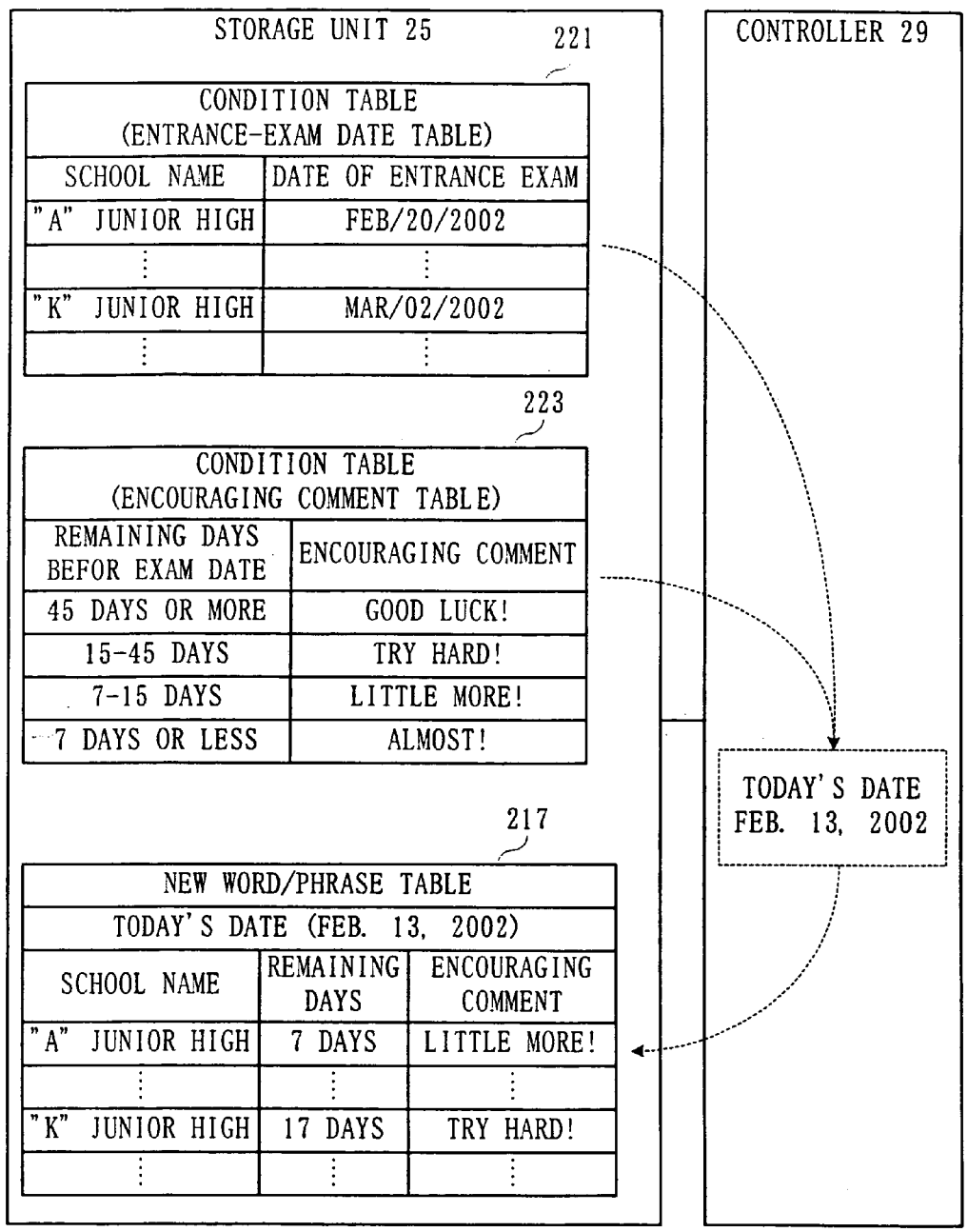
FIG. 6 is a diagram exemplarily showing the word/phrase preparation process carried out by the controller.

As shown in FIG. 6, the controller 29 creates a new word/phrase table 217, in the manner as will be explained later, based on the today's date found out in the step S201, and the entrance-exam date table 221 and encouraging-comment table 223 which are both stored in the storage unit 25.

The controller 29 secures a storage area for storing the newly-created word/phrase table 217, in the storage unit 25 (Step S202).

The controller 29 selects one of the plurality of records included in the entrance-exam date table 221 (Step S203).

Subsequently, the controller 29 acquires the corresponding school name and the exam date from the selected record (Step S204).

The controller 29 obtains the remaining days before the exam date, based on the today's date found in the step S201 and the exam date acquired in the step S204 (Step S205).

After this, the controller 29 acquires an encouraging comment corresponding to the obtained remaining days, from the encouraging comment table 223 (Step S206).

The controller 29 stores the school name acquired in the step S204, the remaining days obtained in the step S205 and the encouraging comment acquired in the step S206 in association with each other so as to form a single record, in the word/phrase table 217 of the storage unit 25 (Step S207).

Thereafter, the controller 29 determines whether the above procedures of the steps S203 to S207 have been done for the entire records of the entrance-exam date table 221 (Step S208).

In the case where the above procedures of the steps S203 to S207 have not been performed for the entire records (Step S208; NO), the controller 29 returns to the procedure of the step S203, and executes the above procedures of the steps S203 to S207 for any of non-executed records.

On the contrary, in the case where it is determined that the above procedures of the steps S203 to S207 have been completed for the entire records (Step S208; YES), the controller 29 completes the word/phrase preparing process.

Accordingly, the message corresponding to the attributes of each student is recorded on the message recording side 11A.

Figures 7A, 7B, 7C:
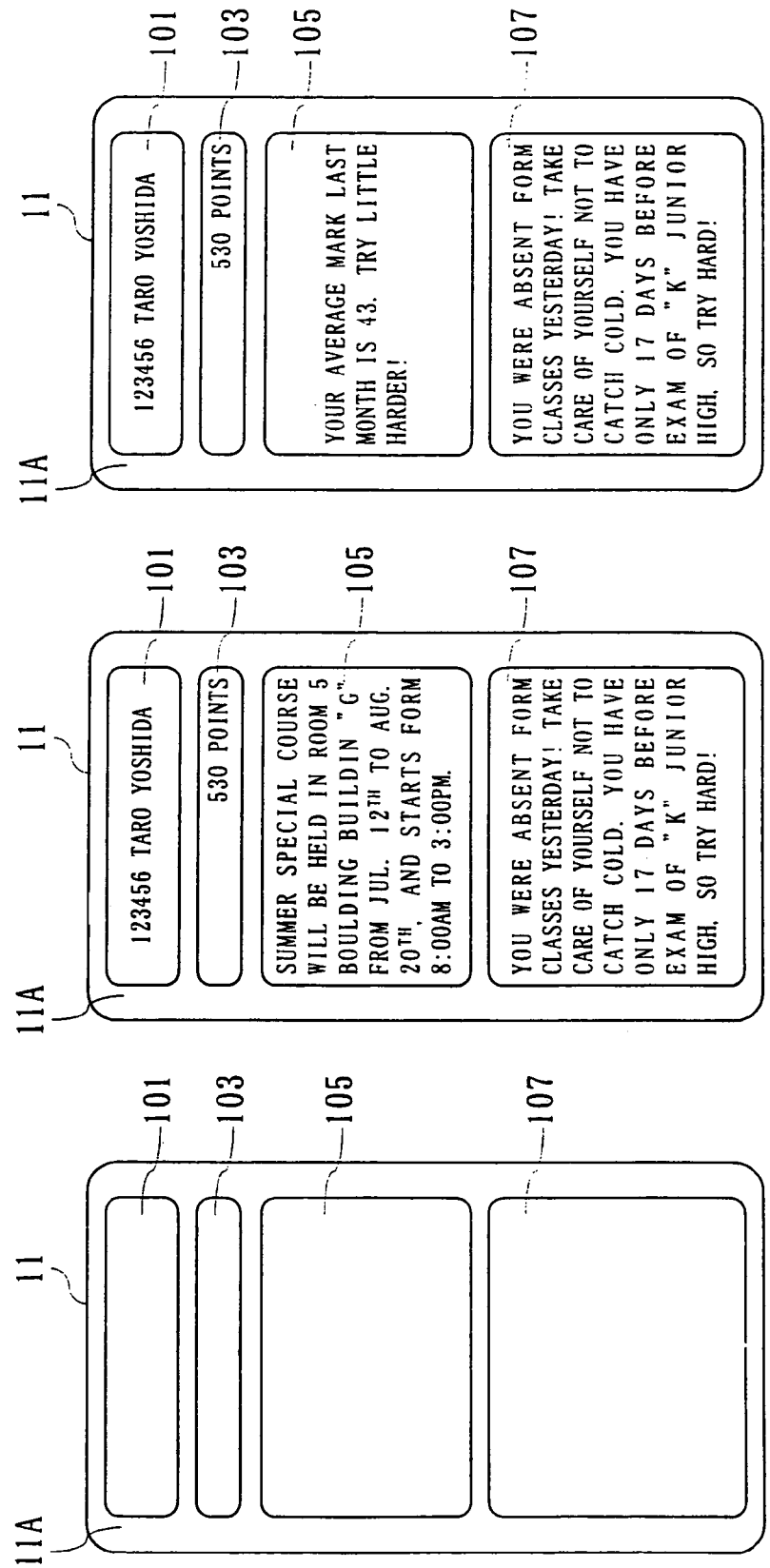
FIG. 7A is a diagram showing the structure of a recording card.
FIGS. 7B and 7C are diagrams each showing a state of the recording card on which information is recorded.

As shown in FIG. 7A, the message recording side 11 is divided into a plurality of recording blocks 101, 103, 105 and 107. As shown in FIG. 7B or 7C, the message corresponding to attributes of each student is recorded in each of the blocks 101, 103, 105 and 107. In particular, as illustrated in FIGS. 7B and 7C, recorded are a message corresponding to the fixed information of each student, such as his/her class, the school to apply to, etc., and a message corresponding to the record-information, such as each student's attendance, marks in a corresponding course, etc.

According to the message system of this embodiment, a message corresponding to attributes (including the past records of his/her performance) of each student (member) is recorded on the member's recording card 11. The recorded message is updated every time the recording card 11 is inserted into the card processor 13. Thus, the members can expect something new in the message recorded on their recording cards 11. If the contents of the message correspond to the attributes (including the past records of his/her performance) of each member, the recording card 11 itself can be effective for improving the sales of target product items, services, etc. or for keeping customers interested in the target items, etc.

Since the date changes once a day, it is sufficient enough to create the word/phrase table 217 once a day as well. Thus, the controller 29 may be created at a predetermined time (e.g. one hour before a class begins) every day. By this, at the time the message providing process is to start, all word/phrase tables necessary for forming up a predetermined message will have already been stored in the storage unit 25. Hence, the procedures of the steps S102 and S103 included in the message providing process are not required.

The above-described external factor does not have to be the date/time, and may include some factor that each member or the member's institution can't control. For example, the external factor may be the weather, traffic jam, political situation or economy conditions, or the like. In this case, the words/phrases of the word/phrase table need to be changed many times a day, in accordance with a change in the external factors. To do this, the controller 29 may acquire the latest information of external factors from a server on the Internet, etc., through the network N. The controller 29 may execute the message providing process shown in FIG. 4 using the acquired latest information, thereby creating the word/phrase table corresponding to the change in the external factors.

Figure 8A:
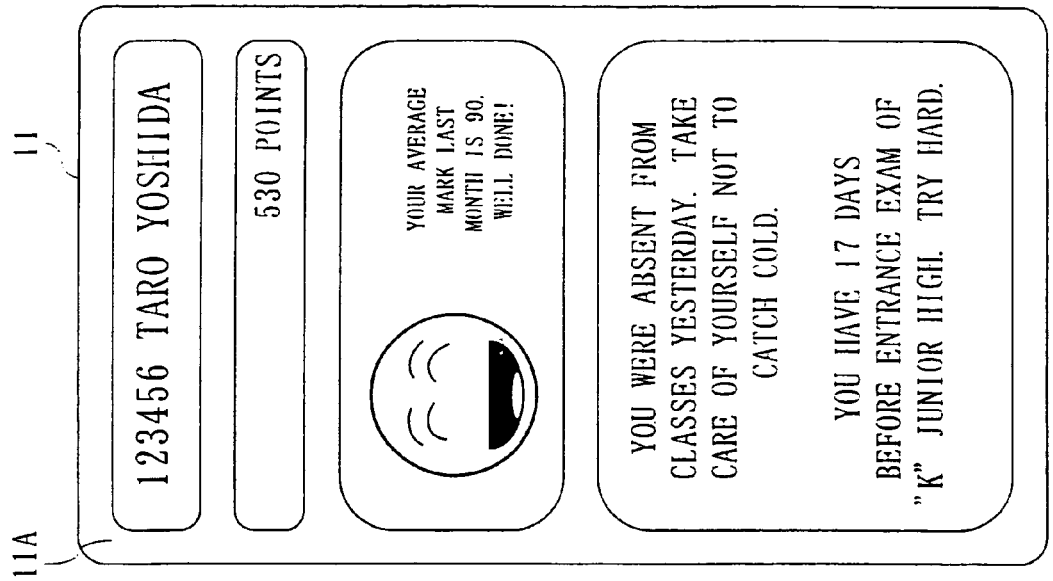
FIGS. 8A and 8B are diagrams showing another example of information to be recorded on the recording card.
Figure 8B:
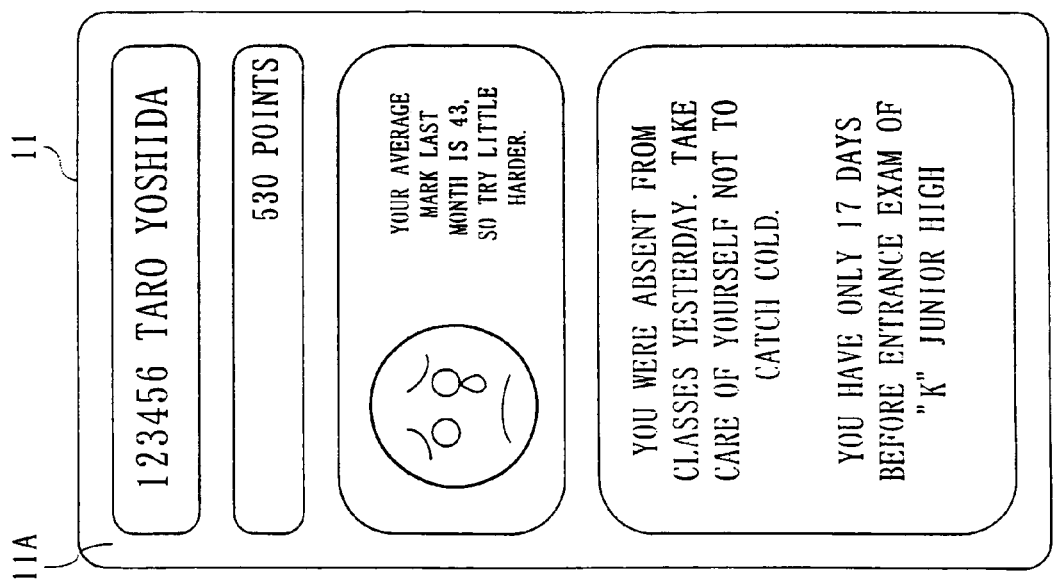

The controller 29 may control the thermal recording unit 273 to record illustrations, drawings, etc. representing the contents of a message on the recording card 11, together with the message, as shown in FIGS. 8A and 8B.

Figure 9:
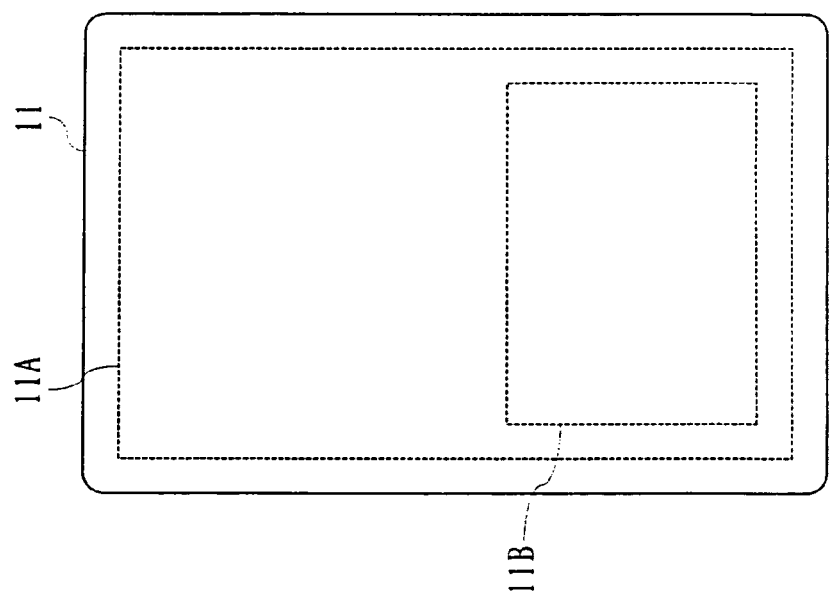
FIG. 9 is a diagram showing another structure of the recording card.

The structure of the recording card 11 is arbitrary. For example, as shown in FIG. 9, the message recording side 11A and the magnetic recording side 11B may be prepared on the same side.

An IC card, which includes the message recording side 11A on one side thereof and a contact electrode one the one side or the other side thereof, may be employed as the recording card 11.

The message recording method is arbitrary, as long as visible message can repeatedly be recorded on the card.

It is not limited that the recording card 11 is issued by the above-described preparatory educational institution, as long as the visible message can repeatedly be recorded thereon. For example, the recording card 11 may be a ticket, a prepaid card or a membership card, etc., that can be used many times and issued by a sports-gym, a library, a theater, a hospital, or the like.

The recording of the message on the recording card 11 is not the only one message providing method.

For example, as shown in FIG. 10, an e-mail address of the member who possesses the recording card 11 may be included in the attribute information recorded on the recording card 11. The controller 29 may send the created message to the e-mail address shown by the attribute information read out from the recording card 11, through the communications unit 23. By so doing, the member can receive messages corresponding to his/her attributes (including the past records of how he/she has done in a particular field), through e-mails.

Furthermore, the controller 29 may send the created message to the e-mail address shown in the attribute information, and record the created message onto the recording card 11, likewise the above.

The attribute information may include various kinds of information, other than the above information. For example, in the above example of the preparatory educational institution, the attribute information may include a mark or ranking on a trial exam of each student. Further, in accordance with the field employing the present invention, the attribute information may include any of the following information items of "work place", "school", "post at work place", "type of job", "means for going to work place or school", "hobby", "health", "age", "occupation", "sex", "address", "body shape", "income", "married or unmarried", "eyesight", "family", "purchase history (preference in brand, quantity, frequency, category, etc.)", "music", "magazine/newspaper", "birthday", "blood type", "zodiac", "favorite singer/actor/actress", and "purchased products".

The message contents may be some kind of announcement, sales promotion, service message, personal message service, and/or step-up display character, etc.

For example, the announcement may include a want ad, seasonal service information, event information, CI information, or information about a store, etc. The contents of the sales promotion may include introduction of new products or introduction of frequently-sold products. The contents of the service message may include, for example, a point-earning service, a coupon service or medical services, etc. The contents of the personal message service may include some celebrating message (including birthday, anniversary celebration) or advice.

It is not necessary that the entire attribute information be recorded on the recording card 11. For example, in the case where the recording card 11 does not have enough capacity for recording the entire attribute information, only ID information (e.g. member number) for identifying the member may be recorded on the recording card 11. In this case, the storage unit 25 of the card processor 13 or the center device 15 may store the entire attribute information, instead. The controller 29 may acquire the attribute information from the storage unit 25 or the center device 15, based on the ID information read out from the recording card 11.

In the above embodiment, the description of the present invention has been made to the case where the card processor 13 and the center device 15 are connected with each other through the network N. However, the card processor 13 and the center device 15 may be connected directly with each other, so as to be incorporated together.

The system of the present invention can be realized by a general computer, without the need for a dedicated system. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the system of the present invention. The above program and data may be stored in a disk device or the like in the server device on the Internet, and embedded in a carrier wave. The program and data embedded in the carrier wave may be downloaded into the computer so as to realize the system of the present invention.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-054692 filed on Feb. 28, 2001, and including specification, claims, drawings and summary. The disclosure of the above Japanese Patent Application is incorporated herein by reference in its entirety.

What is claimed is:

1. A message system comprising:
a message table memory that stores a message table including an attribute column indicating an attribute and a corresponding message column storing message data for each attribute indicated in the attribute column;
a word/phrase table memory that stores plural word/phrase tables each containing words and phrases corresponding to a respective attribute indicated in the attribute column in the message tables, and a sentence including at least one non-settled information portion wherein no word/phrase has been settled yet;
an attribute obtainer that obtains the attribute of a member;
a word/phrase selector that selects words or phrases corresponding to the obtained attribute from the word/phrase tables;
a message creator that sets at least one word or phrase selected from the word/phrase tables into the non-settled information portion in the word/phrase of the sentence, thereby creating a message; and
a message output that outputs the created message.

2. The message system according to claim 1, further comprising:
a recorder that records the attribute information of the at least one member on a card possessed by the at least one member.

3. The message system according to claim 2, wherein:
said attribute obtainer obtains the attribute information by reading out the attribute information of the at least one member who possesses the card, from the card.

4. The message system according to claim 1, wherein:
said message output sends an e-mail representing the message created by said message creator.

5. A message creating method comprising:
providing a message table memory including a message table including an attribute column indicating an attribute and a corresponding message column storing message data for each attribute indicated in the attribute column;
providing a word/phrase table memory including plural word/phrase tables each containing words and phrases corresponding to a respective attribute indicated in the attribute column in the message tables, and a sentence including at least one non-settled information portion wherein no word/phrase has been settled yet;
obtaining the attribute of a member;
selecting words or phrases corresponding to the obtained attribute from the word/phrase tables;
setting at least one word or phrase selected from the word/phrase tables into the non-settled information portion in the word/phrase of the sentence, thereby creating a message; and
outputting the created message.

6. The message creating method according to claim 5, further comprising:
recording the attribute information of the at least one member on a card possessed by the at least one member.

7. The message creating method according to claim 6, wherein:
said obtaining the attribute obtains the attribute information by reading out the attribute information of the at least one member who possesses the card, from the card.

8. The message creating method according to claim 5, further comprising:
sending an e-mail representing the created message.

* * * * *